United States Patent Office

2,867,666
Patented Jan. 6, 1959

2,867,666

PRODUCTION OF ALPHA-METHYLBENZYL HYDROPEROXIDE

Floyd B. Erickson, Robert A. Heimsch, and Bernard S. Wildi, Dayton, Ohio, and Tracy M. Patrick, Jr., Kirkwood, Mo., assignors to Monsanto Chemical Company, St. Louis, Mo., a corporation of Delaware No Drawing. Application September 22, 1954
Serial No. 457,782

9 Claims. (Cl. 260—610)

This invention relates to the manufacture of α-methylbenzyl hydroperoxide. In one aspect the invention relates to a method of subjecting ethylbenzene to direct oxidation with molecular oxygen under conditions resulting in good conversions and yields of α-methylbenzyl hydroperoxide.

Several attempts at the direct oxidation of ethylbenzene, which has the formula $C_6H_5CH_2CH_3$, have been reported in the literature. Stephens, Jour. Amer. Chem. Soc., 50, 2523 (1928), treated ethylbenzene with oxygen in the presence of acetic anhydride at 122–124° C. for a period of 11 days. The only product was acetophenone (methyl phenyl ketone). Kharasch et al., Jour. Organic Chemistry, 16, 128 (1951), obtained only 5 percent α-methylbenzyl hydroperoxide, having the formula $C_6H_5CHOOHCH_3$, by oxidation of ethylbenzene with oxygen at 80 to 90° C. for a period of 48 hours in the presence of light. Conner, U. S. Patent 2,661,375, oxidizes ethylbenzene at 70–90° C. using t-butyl hydroperoxide as initiator, and obtains 7.3 percent conversion to hydroperoxide in an unspecified time. He mentions use of temperatures between 25 and 95° C., use of aqueous alkali, and use of anhydrous conditions without alkali but with hydroperoxide initiator. Various catalysts have been used in the oxidation of ethylbenzene, resulting in the formation of acetophenone and/or phenylmethyl carbinol. The large amount of research reported during the past several years on hydroperoxides has emphasized that non-tertiary hydroperoxides, i. e., those wherein the —OOH group is attached to a non-tertiary carbon atom, are much less stable towards heat than the tertiary hydroperoxides. Thus, Criegee in his review article in Fortschritte der chemischen Forschung, 1, 508–566 (1950), pointing out that secondary hydroperoxides are less stable than tertiary says: "While tertiary hydroperoxides are quite thermally resistant for the most part . . . in other cases, decomposition occurs more easily." Criegee also states that "while tertiary hydroperoxides (outside of any salt formation occurring) are largely resistant to alkalis, with the secondary and primary, especially on warming, the splitting out of water with formation of ketones or aldehydes occurs easily." Numerous patents have issued in recent years on production of tertiary hydroperoxides by the direct oxidation of tertiary alkyl aromatic hydrocarbons. British 629,637, issued to a group of workers active in this field, is directed to such oxidation and to hydrocarbon oxidations generally. While the production of hydroperoxides from numerous tertiary alkyl aromatic hydrocarbons is mentioned, it is stated that ethylbenzene gives acetophenone and phenylmethyl carbinol. No conditions are given for the oxidation of ethylbenzene. All of the foregoing therefore naturally points to the conclusion that α-methylbenzyl hydroperoxide is difficult to make by simple direct oxidation of ethylbenzene.

An object of this invention is to produce α-methylbenzyl hydroperoxide (also termed α-phenylethyl hydroperoxide, or methylphenylmethyl hydroperoxide, or methylphenylhydroperoxymethane). Another object of the invention is to provide a method of obtaining α-methylbenzyl hydroperoxide directly from ethylbenzene. A further object is to provide conditions of reaction whereby ethylbenzene can be subjected to direct oxidation with molecular oxygen resulting in formation of α-methylbenzyl hydroperoxide in good yields. A further object is to make possible the formation of α-methylbenzyl hydroperoxide from ethylbenzene with a shortened reaction period. Yet another object is to effect the oxidation of ethylbenzene at high temperatures yet under conditions chosen so as to permit the production and recovery of α-methylbenzyl hydroperoxide. Further objects and advantages of the invention will be apparent to one skilled in the art from the accompanying disclosure and discussion.

In accordance with the present invention in preferred embodiments, ethylbenzene is subjected to the action of molecular oxygen, i. e., pure oxygen or gases containing oxygen, e. g., air, at a temperature of at least 125° C., in the presence of a basic substance effective to permit production of α-methylbenzyl hydroperoxide, and the oxidation is stopped so that the period of time during which the oxidation is permitted to proceed is not in excess of that required to produce maximum α-methylbenzyl hydroperoxide content in the reaction mixture. We have found that the production of the hydroperoxide is possible at these high temperatures, despite the contrary indications of the art, provided the reaction time is strictly limited and provided also that a suitable basic substance, e. g., sodium bicarbonate, calcium oxide, is present. Use of the basic substance at such conditions is clearly contraindicated by the art, yet we have found not only that it is permissible but essential in order to obtain substantial yields of hydroperoxide by the direct oxidation of ethylbenzene. In addition to the foregoing requirements, we also much prefer to effect the oxidation in an anhydrous reaction mixture. This is accomplished by deliberately removing water as such from the reaction mixture, either by physical or chemical means. Even when anhydrous reactants are used some water is formed by side reactions during the oxidation procedure and removal of same is desirable.

The preferred procedure is to effect an intimate admixture of liquid ethylbenzene, containing a basic substance of the nature described, with air or other gas comprising molecular oxygen at the stated conditions. Preferably, a temperature of 135° C. to 160° C. is used. In general, the higher the temperature the shorter the reaction time. Thus, in a series of comparative runs in which water was not deliberately removed from the reaction system and in which all conditions were the same, with the exception of temperature, a maximum content of α-methylbenzyl hydroperoxide in the reaction mixture was obtained in a period of 3 to 4 hours at 150° C., whereas a maximum content was attained only after 17 hours at 125° C. In all cases, the oxidation must be deliberately stopped before or at the time the maximum α-methylbenzyl hydroperoxide content of the reaction mixture is reached. By effecting the oxidation of ethylbenzene as described herein, conversions of ethylbenzene up to 15 weight percent and higher to α-methylbenzyl hydroperoxide are obtainable, with ultimate yields, i. e., mole percent α-methylbenzyl hydroperoxide obtained based upon ethylbenzene consumed, above 50 percent when stopping the reaction at the point of maximum hydroperoxide content. Still higher yields are obtained by stopping the reaction short of the maximum, for example when the α-methylbenzyl hydroperoxide content of the reaction mixture has reached only 7 to 10 weight percent.

While the oxidation is best carried out at a temperature of at least 135° C., some of the benefits of the invention are obtained at temperatures on down to 125° C. At the lower temperatures, the highest yields of hydroperoxide are obtained; however, the reaction period required to reach maximum α-methylbenzyl hydroperoxide content is comparatively long. Much higher temperatures, up to 200° C. and higher, can be used, although the maximum conversion and yield are apt to be less than when operating in the preferred range of 135° C. to 160° C. Adequate heat removal capacity must be provided in the system in any event, and this is especially important when the reaction is effected extremely rapidly at temperatures above 160° C.

The reaction can be effected by bubbling air, for example, through liquid ethylbenzene held in a glass or metal reaction vessel at the desired temperature and containing dispersed therein a small amount of the desired alkaline material. Preferably such a vessel is equipped with a reflux condenser to minimize losses in effluent vapors. Such vapors can be diluted with steam or inert gas to minimize explosion hazards. The reaction can be carried out at atmospheric pressure, but superatmospheric pressures, for example from 50 to 500 pounds per square inch, are preferred. In passing an oxygen-containing gas continuously through a body of the liquid reaction mixture, it is often desirable to use from two to five times the stoichiometric quantity; the stoichiometric quantity is calculated on this basis as that amount of oxygen actually being used up to oxidize organic materials in the reaction mixture. Alternately, an entirely closed system can be used, with sufficient pure oxygen, air or other gas containing molecular oxygen being introduced at the start, or over a period of time, to provide the required oxygen for the reaction. In any event, it is of course desirable to obtain an intimate admixture of oxygen with the liquid reaction mixture as by vigorous stirring, shaking, passing fine bubbles of gas through liquid reaction mixture, flowing a mixture of ethylbenzene and oxygen turbulently through a tubular reactor, or the like, as will be well understood by those skilled in the art. Suitable means should be provided for removing the exothermic heat of reaction, and for avoiding the presence of local hot spots. The quantity of molecular oxygen employed will of course depend to a considerable extent upon the particular apparatus used. Oxygen in an amount insufficient to react with all of the ethylbenzene present can be used, or appreciable excesses of oxygen are also permissible, especially where the gas is being continuously passed through a body of liquid reaction mixture.

Those skilled in the art will appreciate that the usual precautions should be taken in view of the fact that mixtures of hydrocarbon and oxygen are involved, and in view of the known tendency of hydroperoxides to undergo violent decomposition on occasion. Adequate protection for personnel and equipment should be provided in known manner. Pressure rupture disks should be used in closed reaction systems, and the reactor in all cases should be shielded.

Ordinarily the oxidation is effected with ethylbenzene and molecular oxygen as the sole reactive constituents of the initial reaction mixture, together with the basic substance chosen. Addition of a small quantity of α-methylbenzyl hydroperoxide or other peroxide, or other initiator at the start of the reaction is permissible but not at all required. If desired an initiator such as ethyl acetoacetate, phenylacetone, acetylacetone, etc., can be employed, and this permits the reaction to be carried out at a lower temperature. Inert solvents can be present to aid in temperature control, but care should be taken that solvents are not employed that tend to accelerate the rate of decomposition of the α-methylbenzyl hydroperoxide product. For example ordinary benzene containing some thiophene is not suitable as the thiophene contained therein apparently greatly accelerates the decomposition of the hydroperoxide. As permissible solvents can be mentioned thiophene-free benzene, toluene, acetic anhydride, etc., but it should be noted that these materials generally tend to decrease the rate of formation of α-methylbenzyl hydroperoxide.

Metallic oxidation catalysts such as cobalt or manganese salts, e. g., cobalt naphthenates, should not be present in the reaction mixture or the oxidation will produce acetophenone and/or methyl phenylcarbinol or other oxidation products and not the desired hydroperoxide.

It is essential that a basic substance be employed in the reaction mixture. The preferred basic substances are the alkali metal carbonates and the alkaline earth metal carbonates and oxides (the term "carbonates" includes bicarbonates where the latter exist). Preferred are sodium carbonate, sodium bicarbonate, calcium carbonate, and calcium oxide. Other suitable ones may include, for example, potassium bicarbonate, strontium carbonate, barium oxide. Suitable quantities include the range of 0.5 to 10 weight percent based on ethylbenzene. Strong bases, such as sodium hydroxide, and organic bases, such as pyridine, are not suitable. The only requirement of the basic substance is that it be effective to permit production of α-methylbenzyl hydroperoxide. One skilled in the art, having had the benefit of the present disclosure, can readily determine by simple obvious tests the suitability of any particular basic substance.

Certain bases that are capable of combining with water, for example calcium oxide, are particularly desirable in that they serve a dual function of not only providing the necessary alkaline material but also assuring the anhydrous nature of the reaction mixture. Thus, some of the value of calcium oxide is attributed to removal of water formed during the reaction. Alternatively, water can be trapped out of condensed vapors being refluxed and returned to the liquid reaction mixture, thereby removing water from the system. Even better results are obtained with this type of operation by passing the returning reflux ethylbenzene through a body of drying agent, for example anhydrous calcium sulfate, before returning it to the reaction mixture.

Maintaining an anhydrous reaction mixture has several positive benefits. One important advantage is that the period of time over which the hydroperoxide content of the reaction mixture remains at the maximum is considerably lengthened as compared to a system in which removal of water is not practiced. In the latter instance oxidation proceeds until a maximum hydroperoxide content is attained in the reaction mixture, after which the hydroperoxide content abruptly begins to decrease. By providing for water removal, hydroperoxide content reaches a maximum and then tends to remain fairly constant over an extended period of time, which may be from one to several hours, before the hydroperoxide content begins to decrease. Additionally, considerably higher conversions to hydroperoxide are realized when operating in an anhydrous system as compared with a system in which water removal is not practiced. In some instances anhydrous conditions make possible a greater yield of α-methylbenzyl hydroperoxide. When condensing ethylbenzene vapors from effluent gas, drying the condensate, and then returning it to the reaction mixture, increasing the rate of gas flow through the reaction mixture improves the results, probably by more rapidly carrying the ethylbenzene-water azeotrope from the liquid reaction mixture.

The following examples provide detailed information on various preferred embodiments of the present invention and illustrate results obtainable under differing conditions of reaction. However, it will be appreciated that these data are given by way of illustration and that various other combinations of reaction conditions and procedures can be employed without departing from the invention in its broadest scope.

EXAMPLES

Description of apparatus

The oxidations described in these examples were carried out in the following reactors, the particular one used being indicated for each run.

*Apparatus I.*—A stainless steel stirred autoclave of 1 liter capacity; air inlet was a stainless steel tubing terminating in the form of an arc immediately below the stirrer below the level of the liquid in the autoclave, the top of the arc being perforated. Electrically heated and instrumentally controlled as to temperature. Air continuously passed through the liquid reaction mixture. Autoclave equipped with a reflux condenser through which off-gas was led before being permitted to exit through a pressure control valve; condensed liquid ran back into the autoclave.

*Apparatus II.*—The same apparatus as Apparatus I, with the exception that a Dean and Stark trap and drying tower were interposed in the return line for the liquid reflux. The trap permitted the separation of a water phase from the liquid reflux and this water phase was withdrawn from the system while the hydrocarbon phase of the reflux was returned to the autoclave, first passing through a drying tower filled with anhydrous calcium sulfate.

*Apparatus III.*—Similar to Apparatus I except the capacity was one gallon.

Description of procedure

Samples of the reaction mixture were taken at the end of each run, and in most of the runs during the run, and analyzed for hydroperoxide content by iodimetric method. Analyses for acetophenone and ethylbenzene were also made in many instances, the former being by infrared absorption and the latter by removing non-hydrocarbon material with sulfuric acid and determining residual ethylbenzene.

In the runs described hereafter, the following quantities and conditions were used unless otherwise indicated.

Oxidizing agent—Air
Pressure—150 pounds per square inch gauge
Temperature—As noted for each run
Air inlet flow—As indicated for each run
Stirrer tip speed—500 ft./min.
Basic material—As indicated for each run
Charge—

|  | Apparatus I and II | Apparatus III |
|---|---|---|
|  | G. | G. |
| Ethylbenzene | 450 | 1800 |
| α-Methylbenzyl hydro-peroxide (as initiator) | 5.9 | 23.6 |

TEMPERATURE

The data reported below in Table I were obtained in Apparatus I. The reaction mixture contained 15 grams sodium bicarbonate. The air flow was approximately 0.84 cubic feet per hour with the exception that in run E the air flow was double that value after the first half hour. The reaction temperatures cover the range of 125° C. to 150° C. as indicated in the table.

TABLE I
*Oxidation of ethylbenzene*
[Effect of temperature and time.]

| Run | Temp. °C. | Time (Hrs.) | | Conversion to α-Methylbenzyl Hydroperoxide, Mole Percent | | Conversion to Acetophenone, Mole Percent |
|---|---|---|---|---|---|---|
|  |  | At Max.[3] | Total | At Max.[3] | Final | Final |
| A | 125 | 17 | 17.5 | 9.9 | 9.1 | 0.9 |
| B | 130 | (¹) | 14 | (¹) | 11.4 | 1.4 |
| C | 135 | 8.5 | 12.5 | 8.6 | 0 | 7.0 |
| D | 140 | 6.8 | 7.3 | 14.0 | 11.0 | 2.8 |
| E | 150 | 3.5 | 4.5 | 11.5 | (²) | 16.9 |

[1] Run stopped before maximum conversion determined.
[2] Conversion to hydroperoxide at 4.0 hours was 5.4 percent. Hydroperoxide not measured at close of run (4.5 hours) assumed zero from extrapolation of hydroperoxide conversion curve and from acetophenone analysis. Acetophenone conversion was 6.6 percent at 4.0 hours and 16.9 percent at 4.5 hours.
[3] "At Max." means at point of maximum conversion to α-methylbenzyl hydroperoxide.

Examination of the data of Table I reveals that with the exception of run B, which was stopped before a maximum conversion to hydroperoxide had been established, all the runs attained a maximum hydroperoxide conversion, and immediately thereafter the drop in hydroperoxide percentage was very rapid, runs C and E were allowed to continue until the hydroperoxide content had reached zero. Runs A and D were stopped soon after the rapid decomposition of hydroperoxide had begun.

The data in Table I show clearly that the increase of temperature from 125° C. on up to 150° C. resulted in marked shortening of the time required for the maximum conversion to α-methylbenzyl hydroperoxide to be attained. It is clear that conversions of 10 percent and higher of ethylbenzene to α-methylbenzyl hydroperoxide can be achieved at these temperatures provided the oxidation is deliberately stopped at or before the time at which the maximum conversion to hydroperoxide is reached.

Data are reported in Table II below for tests similar to those given in Table I with the exception that the runs were made in Apparatus II, which provided for deliberate removal of water from the reaction mixture. Air flow was 1.68 cubic feet per hour. Basic substance was 10 grams calcium oxide.

TABLE II
*Oxidation of ethylbenzene*
[Effect of temperature and time, anhydrous conditions.]

| Run | Temp. °C. | Time (Hrs.) | | Conversion to α-Methylbenzyl Hydroperoxide, Mole Percent | | Conversion to Acetophenone, Mole Percent |
|---|---|---|---|---|---|---|
|  |  | At Max. | Total | At Max. | Final | Final |
| F | 135 | (¹) | 14 | (¹) | 13.1 | 4.3 |
| G | 140 | 10–11 | 13 | 13.6 | 13.1 | 6.8 |
| H | 150 | 5–6 | 7 | 14.5 | 13.5 | 11.8 |

[1] Run stopped before maximum determined.

Comparison of the data of Table II with those in Table I shows that in general conversions were higher when anhydrous conditions were assured in the reaction zone, and the precipitous drop in hydroperoxide conversion in the runs of Table I did not occur—rather the hydroperoxide leveled off at the maximum and began to drop only slowly thereafter.

RATIO OF α-METHYLBENZYL HYDROPEROXIDE TO ACETOPHENONE

A high ratio of the desired α-methylbenzyl hydroperoxide to acetophenone by-product is obtained in the practice of this invention. This ratio is highest at the lowest temperatures, but it is still comparatively high at the higher temperatures at which the rate of reaction is much faster.

In Table III below, the α-methylbenzyl hydroperoxide: acetophenone mole ratio existing when 7 percent conversion to the hydroperoxide had been attained, is given for the runs reported in Tables I and II above.

TABLE III

Mole ratio of α-methylbenzyl hydroperoxide to acetophenone (at 7 mole per cent conversion to hydroperoxide)

| Run | Oxidation Temperature, °C. | Mole Ratio |
|---|---|---|
| A | 125 | 14.0 |
| B | 130 | 14.0 |
| F | 135 | 8.7 |
| G | 140 | 8.7 |
| E | 150 | 7.4 |
| H | 150 | 8.2 |

BASE

Data are given in Table IV for the attempted oxidation, in Apparatus I, of ethylbenzene in the absence of a basic substance. Air flow was 0.84 cubic feet per hour. It will be seen that practically no oxidation occurred.

TABLE IV

Attempted oxidation of ethylbenzene in absence of alkaline material

| Run | Temp., °C. | Time (hrs.) | Hydroperoxide in reaction mixture, Wt. Percent |
|---|---|---|---|
| I | 135 | 0 | 1.3 |
|   |     | 2 | 0.7 |
|   |     | 3 | 0.2 |
|   |     | 5 | 2.2 |
|   |     | 6 | 2.6 |
|   |     | 7 | 2.8 |

These data can be compared with the data for run C in Table I wherein sodium bicarbonate was employed at the same temperature and with the data for run F in Table II wherein calcium oxide was employed at the same temperature.

Similar runs were made using calcium carbonate and sodium carbonate as a basic material gave approximately the same results as obtained with sodium bicarbonate and with calcium oxide. Calcium oxide demonstrates a superiority over the other basic materials mentioned by giving an appreciably higher maximum conversion to hydroperoxide and a higher ratio of α-methylbenzyl hydroperoxide to acetophenone at or near the maximum conversion.

WATER

Data are given in the following Table V which show the difference in results obtained when effecting the oxidation without the deliberate removal of water in one instance and with the deliberate removal of water by drying the returning liquid reflux in the other instance. The first run, No. C (also reported earlier in Table I), was effected in Apparatus I while the second, No. J, was effected in Apparatus II. In both runs, 15 grams sodium bicarbonate was used, and the air flow rate was 0.84 cubic feet per hour.

TABLE V

Oxidation of ethylbenzene
[Effect of water removal.]

| Run | Temp., °C. | Time (Hrs.) | | Conversion to Hydroperoxide, Mole Percent | | | Conversion to Acetophenone, Mole Percent |
|---|---|---|---|---|---|---|---|
| | | At Max. | Total | At Max. | At 10 hrs. | Final | Final |
| C | 135 | 8.5 | 12.5 | 8.6 | 4.5 | 0 | 7.0 |
| J | 135 | 8-11 | 11.5 | 10.0 | 10.0 | 8.4 | 5.9 |

It will be noted not only that the drying permitted the attainment of higher conversion to hydroperoxide, but also the maximum hydroperoxide conversion was maintained steady over a period of 3 hours before this value began dropping, whereas with the undried run the hydroperoxide dropped immediately after attaining the maximum and within 1½ hours had suffered a great decrease.

The superior results obtained with calcium oxide as compared to other basic substances such as calcium carbonate, sodium bicarbonate, etc., are believed to be due at least in part to its capacity to remove water from the reaction mixture.

OXYGEN

Identical runs were made in Apparatus II, at 135° C., with 10 grams calcium oxide and with gaseous flow rate of 1.68 cubic feet per hour, the gas in one instance being air and in the other instance being pure oxygen. At the end of 6 hours, conversion to α-methylbenzyl hydroperoxide was 7.5 mole percent with air and 8.7 mole percent with oxygen.

YIELD

Oxidation of ethylbenzene to α-methylbenzyl hydroperoxide was effected in Apparatus III, at 135° C., air flow 3.36 cubic feet per hour, and with 60 grams of sodium bicarbonate charged to the reactor. The oxidation was stopped at the end of 6 hours. The mole per cent conversion is based upon ethylbenzene charged, whereas the mole percent yield is based upon ethylbenzene destroyed. Results are presented in Table VI.

TABLE VI

Oxidation of ethylbenzene
[Conversions and yields.]

| Product | Conversion, Mole Percent | Yield, Mole Percent |
|---|---|---|
| α-Methylbenzyl hydroperoxide | 7.4 | 70.8 |
| Acetophenone | 0.8 | 7.7 |
| α-Methylbenzyl alcohol | 2.2 | 21.4 |

While the invention has been described with particular reference to various preferred embodiments thereof, it will be appreciated that numerous modifications and variations are possible without departing from the invention.

We claim:

1. A process which comprises oxidizing ethylbenzene with molecular oxygen in the presence of a basic substance selected from the group consisting of the alkali metal carbonates and the alkaline earth metal carbonates and oxides, at a temperature within the range of 135° C. to 160° C. for a period of time limited to produce maximum α-methylbenzyl hydroperoxide content in the reaction mixture.

2. A process which comprises oxidizing ethylbenzene with molecular oxygen in the presence of a basic substance selected from the group consisting of the alkali metal carbonates and the alkaline earth metal carbonates and oxides, at a temperature within the range of 125° C.

to 200° C. for a period of time less than that required to produce maximum α-methylbenzyl hydroperoxide content in the reaction mixture, and recovering α-methylbenzyl hydroperoxide from the reaction mixture.

3. A process which comprises oxidizing ethylbenzene with molecular oxygen in the presence of a basic substance selected from the group consisting of the alkali metal carbonates and the alkaline earth metal carbonates and oxides, at a temperature of at least 125° C. but not so high as to prevent the production and recovery of α-methylbenzyl hydroperoxide product, for a period of time not in excess of that required to produce maximum α-methylbenzyl hydroperoxide content in the reaction mixture.

4. A process according to claim 3 wherein said oxidizing is effected at superatmospheric pressure.

5. A process which comprises oxidizing ethylbenzene with molecular oxygen in the presence of a basic substance selected from the group consisting of the alkali metal carbonates and the alkaline earth metal carbonates and oxides, at a temperature of at least 125° C. but not so high as to prevent the production and recovery of α-methylbenzyl hydroperoxide product, for a period of time not in excess of that required to produce maximum α-methylbenzyl hydroperoxide content in the reaction mixture, while maintaining said reaction mixture anhydrous.

6. A process which comprises oxidizing ethylbenzene with molecular oxygen in the presence of calcium oxide at a temperature of at least 125° C. but not so high as to prevent the production and recovery of α-methylbenzyl hydroperoxide product, for a period of time not in excess of that required to produce maximum α-methylbenzyl hydroperoxide content in the reaction mixture.

7. A process which comprises oxidizing ethylbenzene with molecular oxygen in the presence of a basic substance selected from the group consisting of the alkali metal carbonates and the alkaline earth metal carbonates and oxides, at a temperature within the range of 135° C. to 160° C., removing water from the reaction mixture by vaporization, and stopping the oxidation no later than the point at which maximum α-methylbenzyl hydroperoxide content for the chosen temperature would be attained in the reaction mixture.

8. A process which comprises passing a gas comprising molecular oxygen through a body of liquid ethylbenzene containing a basic substance selected from the group consisting of the alkali metal carbonates and the alkaline earth metal carbonates and oxides, at a temperature of at least 125° C. but not so high as to prevent the production and recovery of α-methylbenzyl hydroperoxide product, for a period of time not in excess of that required to produce maximum α-methylbenzyl hydroperoxide content in the reaction mixture, condensing ethylbenzene and water from effluent gas, removing water from condensed liquid ethylbenzene, and returning thus-dried ethylbenzene to the reaction mixture.

9. A process which comprises intimately contacting liquid ethylbenzene containing calcium oxide with a gas comprising molecular oxygen at a temperature within the range of 135° C. to 160° C., and stopping the oxidation when maximum α-methylbenzyl hydroperoxide content for the chosen temperature has been attained in the reaction mixture.

References Cited in the file of this patent

UNITED STATES PATENTS

| | | |
|---|---|---|
| 2,632,772 | Armstrong et al. | Mar. 24, 1953 |
| 2,632,774 | Conner et al. | Mar. 24, 1953 |
| 2,661,375 | Conner | Dec. 1, 1953 |

FOREIGN PATENTS

| | | |
|---|---|---|
| 676,770 | Great Britain | Aug. 6, 1952 |